United States Patent
Pandey et al.

(10) Patent No.: US 10,877,854 B2
(45) Date of Patent: Dec. 29, 2020

(54) PARTIAL RESTORE FROM TAPE BACKUP

(71) Applicant: EMC IP Holding Company LLC, Hopkinton, MA (US)

(72) Inventors: Sonal Pandey, Bangalore (IN); Venkatraman Venkatasubramanyam, Chennai (IN); Vaibhav Jain, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/597,753

(22) Filed: Oct. 9, 2019

(65) Prior Publication Data
US 2020/0042409 A1    Feb. 6, 2020

Related U.S. Application Data

(63) Continuation of application No. 15/297,456, filed on Oct. 19, 2016, now Pat. No. 10,481,985, which is a continuation of application No. 14/231,248, filed on Mar. 31, 2014, now Pat. No. 9,501,369.

(51) Int. Cl.
*G06F 11/00* (2006.01)
*G06F 11/14* (2006.01)

(52) U.S. Cl.
CPC ........ *G06F 11/1469* (2013.01); *G06F 11/14* (2013.01); *G06F 11/1435* (2013.01); *G06F 11/1438* (2013.01); *G06F 11/1471* (2013.01); *G06F 2201/84* (2013.01)

(58) Field of Classification Search
CPC .. G06F 11/1469; G06F 11/14; G06F 11/1435; G06F 2201/84; G06F 11/1471; G06F 11/1438; G06F 11/1456; G06F 11/1451
USPC .......................................................... 714/15
See application file for complete search history.

(56) References Cited

U.S. PATENT DOCUMENTS

| | | | |
|---|---|---|---|
| 7,793,146 B1 | 9/2010 | Gibson | |
| 8,060,476 B1 | 11/2011 | Afonso | |
| 8,966,318 B1 * | 2/2015 | Shah | G06F 11/3664 714/28 |
| 9,411,821 B1 | 8/2016 | Patwardhan | |
| 9,557,932 B1 | 1/2017 | Chopra | |
| 2006/0106896 A1 | 5/2006 | Carlson | |

(Continued)

OTHER PUBLICATIONS

Definition of backup retrieved from wikipedia backup page : https://en.wikipedia.org/wiki/Backup, on Sep. 17, 2018 (Year: 2018).

*Primary Examiner* — Yair Leibovich
(74) *Attorney, Agent, or Firm* — Van Pelt, Yi & James LLP (57) ABSTRACT

Techniques to restore data from backup are disclosed. In various embodiments, an indication of a subcomponent to be restored from backup is received. View information associated with the backup is used to determine a set of physical components required to be retrieved from the backup to restore the requested subcomponent. The determined set of physical components is retrieved from the backup. The retrieved physical components are used to restore the subcomponent. In various embodiments, the view information includes data that identifies each of a plurality of separately-recoverable subcomponents of the backup and for each one or more physical components comprising the backup which would be required to restore that subcomponent.

20 Claims, 5 Drawing Sheets

(56) References Cited

U.S. PATENT DOCUMENTS

| | | |
|---|---|---|
| 2007/0179998 A1 | 8/2007 | Swanepoel |
| 2009/0276591 A1 | 11/2009 | Mu |
| 2010/0179943 A1 | 7/2010 | Anand |
| 2010/0241618 A1 | 9/2010 | Beatty |
| 2011/0167221 A1 | 7/2011 | Pangal |
| 2012/0233417 A1 | 9/2012 | Kalach |
| 2013/0124807 A1* | 5/2013 | Nielsen ............... G06F 11/1438 711/162 |
| 2014/0006858 A1* | 1/2014 | Helfman ............. G06F 11/1662 714/19 |
| 2014/0075430 A1 | 3/2014 | Zheng |
| 2015/0120893 A1* | 4/2015 | Sapaliga ................ G06F 11/07 709/222 |

\* cited by examiner

PARTIAL RESTORE FROM TAPE BACKUP

CROSS REFERENCE TO OTHER APPLICATIONS

This application is a continuation of co-pending U.S. patent application Ser. No. 15/297,456, entitled PARTIAL RESTORE FROM TAPE BACKUP filed Oct. 19, 2016 which is incorporated herein by reference for all purposes, which is continuation of U.S. patent application Ser. No. 14/231,248, entitled PARTIAL RESTORE FROM TAPE BACKUP filed Mar. 31, 2014 which is incorporated herein by reference for all purposes.

BACKGROUND OF THE INVENTION

Extended data retention solutions export backup data from a primary backup data storage system and/or media to tape, or other lower cost but less readily-accessible media, for long term retention. The exported backup can, if needed, be imported from the tape or other media, for example sometime after the backup is no longer available on the primary backup media.

A user may desire to restore only part of a backup that is stored on tape or similar media. Performing a partial restore from tape or similar media presents certain challenges. For example, browsing and locating the desired data typically consumes time and may require the use of large amounts of storage to stage data as data from the backup is restored and the desired data is located. In addition, data required to perform the partial restore may be scattered on tape, which makes partial restores slow and can also lead to wear and tear of the tape media due to the "shoe shining" effect.

Another challenge in this context is to support partial restore with respect to multiple different applications. Application plugins provided to enable backup clients to be used with different applications may use different logic as required by the requirements of the particular application the data of which is to be backed up. What is partially restorable or desired to be partially restorable may be different for different plugins and can be defined only by the plugin for an application.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generation and use of a "view" metadata to provide the ability to partially restore data from within a tape (or other sequentially accessed) backup are disclosed. In various embodiments, a user interface is provided to enable a user to select an application-level component or subcomponent to import and restore. Subcomponents of a backup are partially imported from tape to save on time and space.

In order to support partial import, in some embodiments, application plugins tag subcomponents of backups/datasets that clients will support restoring individually. For example, in some embodiments, a backup client plugin used to back up a network attached storage (NAS) device with 5 volumes, backed up using an NDMP backup client, e.g., would tag each volume as individually restorable, even though volumes are subcomponents of the single overall NAS backup taken. Clients would then be able to restore only one or more of those subcomponents; volumes in this case, within a single backup. In some embodiments, only data from the selected subcomponent(s) would be moved through the restore path.

Figure 1:
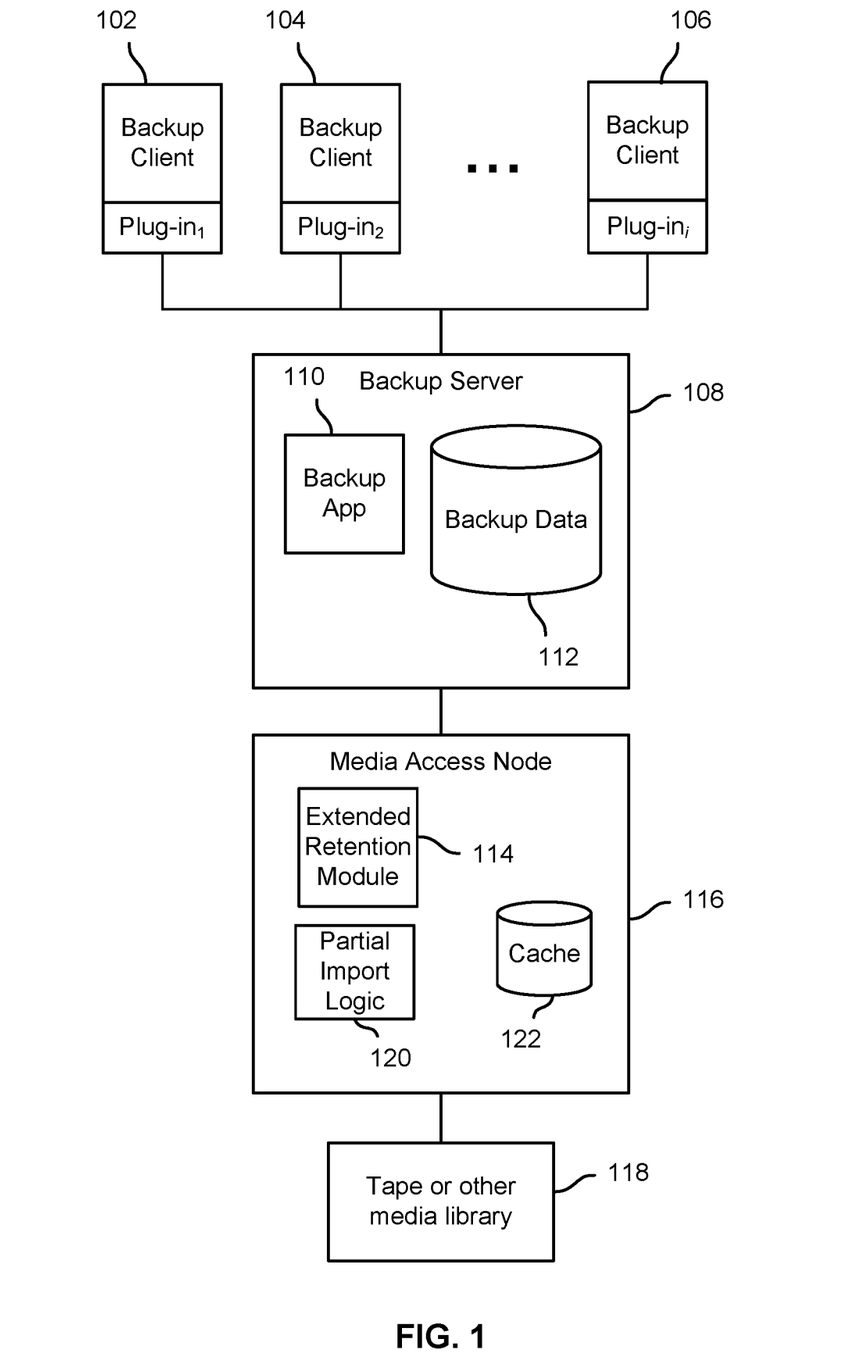
FIG. 1 is a block diagram illustrating an embodiment of a system to provide partial restores from backup.

FIG. 1 is a block diagram illustrating an embodiment of a system to provide partial restores from backup. In the example shown, each of a plurality of backup clients, represented in FIG. 1 by backup clients 102, 104, and 106, uses an application plugin to back up application data of a specific application with which the plug in is associated. For example, an application plugin may include logic tailored to the type of data, file or other data object formats, and/or other requirements or characteristics of an application and its application data. Each backup client and associated application plugin (102, 104, 106) in the example shown generates and provides a backup data and metadata stream to a backup server 108, e.g., via a network or other communication channel. The backup server 108, e.g., an EMC® Avamar® deduplication data storage system, includes a server-side backup application 110, which receives backup data from backup clients such as 102, 104, and 106, and stores associated backup data and metadata in a backup data store 112, which in various embodiments may comprise one or more disk or other storage drives.

In the example shown in FIG. 1, the media access node 116 includes an extended retention module 114. In various embodiments, the extended retention module 114 is configured to copy and/or migrate backup data from the on-disk backup data store 112, for example backup data from older backups, to media access node 116, which in various embodiments is configured to store the backup data for an extended period on tape or other media via a library 118.

In the example shown, the media access node 116 includes a partial import logic 120 configured to extract from a backup data stream a "view" file or other information that identifies partially recoverable subcomponents of the backup and for each information, such as which physical components would be required to be recovered from the backup data in order to partially restore that subcomponent. As used in this context, a partially-recoverable "component" or "subcomponent" of a backup comprises a logical component usable by the originating application to provide some meaningful application-level functionality. Examples include, without limitation, a database included in a backup data set that includes a plurality of databases, and one or more volumes of files included in a backup of a multi-volume data store system, such as the NAS described above. A "physical component" refers to a defined subset of data that is included in a set of backup data and which can be reconstituted from a specific, identifiable subset of the backup data to recreate a component that can be combined with one or more other physical components to restore a partially-recoverable component/subcomponent.

In various embodiments, application plugins, such as plugins 1, 2, and i in the example shown in FIG. 1, include code to generate a "view" file that describes partially-recoverable components/subcomponents. In some embodiments, the view file comprises an XML file or other structured data. The plugins create the view files during backup to describe the backup sub-components, their interrelationships, and attributes required to provide a user with the ability to browse and select a partially-recoverable subcomponent to be restored. The view files get backed up along with the application data and in various embodiments are included by the plugin at a specified location in the backup.

In various embodiments, the partial import logic 120 of FIG. 1 extracts the view file from the backup data, e.g., as it is received from the extended retention module and prepared to be sent to the library 118 to be stored on tape or other media, and caches the view file in cache 122. Caching the view file in various embodiments enables a "browse" interface to be generated and displayed relatively quickly, enabling a user to find and select a partially-recoverable subcomponent to be restored.

In various embodiments, one or more of the backup client and/or the application plugin (102, 104, 106); the extended retention module 114; and the media access node 116 (e.g., the partial import logic 120) include(s) logic to support creation, caching, storage, and use of a view file or similar meta-information to enable users to find and request partial recovery of a partially-recoverable subcomponent.

Figure 2:
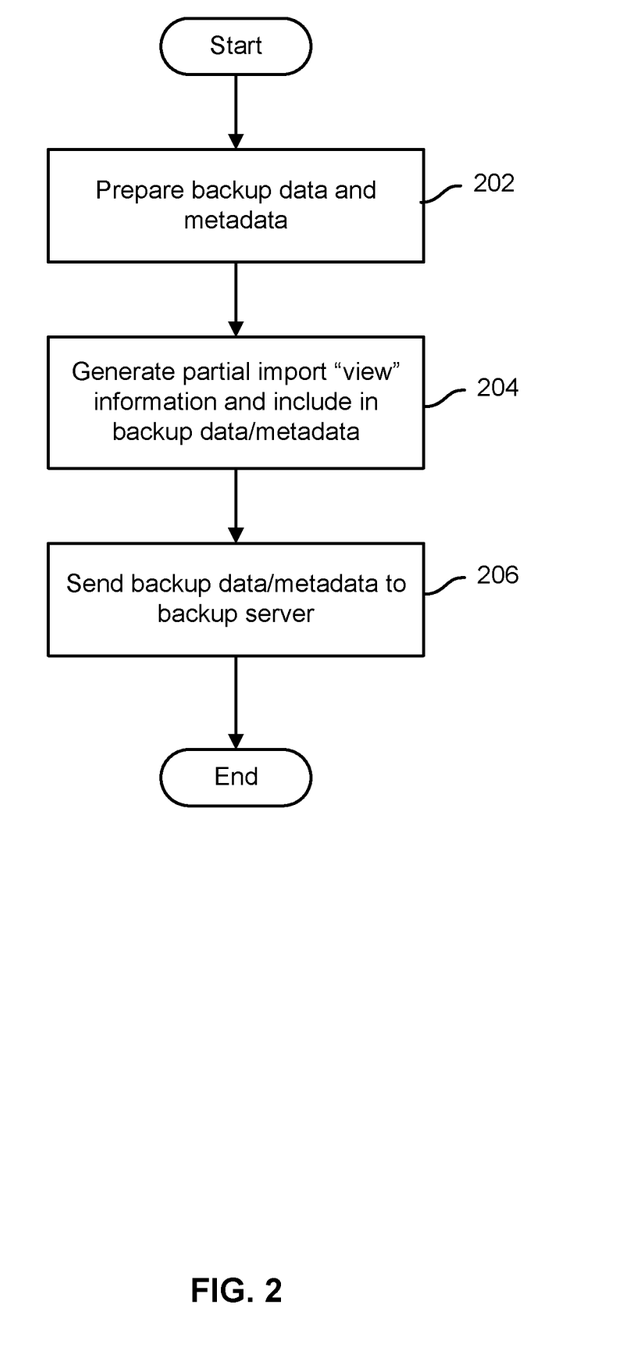
FIG. 2 is a flow chart illustrating an embodiment of a process to generate meta-information to be used to support partial restores from backup.

FIG. 2 is a flow chart illustrating an embodiment of a process to generate meta-information to be used to support partial restores from backup. In various embodiments, the process of FIG. 2 may be performed by a backup client application plugin, such as plugins 1, 2, or i in the example shown in FIG. 1. When it is time to back up application data, the application data is processed to generate backup data and metadata (202). The plugin in various embodiments includes code to generate and include in the backup a "view" file or other structured data that describes partially-recoverable subcomponents of the backup and for each meta-information that may be needed to partially restore that subcomponent.

In various embodiments, the view file may include one or more of the following:
- User Friendly or Logical Name of the backup subcomponent to be displayed on GUI e.g. database or virtual machine name
- Attributes, describing properties e.g. Name, date, size, type etc. Number of columns and values can vary for different applications.
- Mappings to the physical components (Name and full paths) of the backups needed to be restored in order to restore/recover the displayed sub-component properly.

In various embodiments, a view file as disclosed herein may include one or more elements as in the following example:

```
<view version="1">
<browse_contents pid="" ack="false" msgver="5" pidnum="-1"
maxelems="6" incomplete="0" path="Farm/SP15_SQLALIAS/User
Profile Service
Application_SocialDB_4a19049f04b04690b5ed2eb479b37ce3"
mid="3532/2232/52" inprogress="false" wid="Browse">
  <header numcolumns="5">
    <column order="1" type="string" xmltag="name" name="Name" />
    <column order="3" type="string" xmltag="date" name="Date" />
    <column order="4" type="int" xmltag="size" name="Size" />
    <column order="5" type="string" xmltag="type" name="Type" />
  </header>
  <dir name=".system_info" selectable="false" saveas="" />
  <dir name="sp15-sql/c:/program files/avs/var/backupmetadata/sp15-sql"
selectable="false" saveas="" />
    <file name="sp15-sql/c:/program files/microsoft sql
server/mssql10_50.sp15db/mssql/data/user profile service
application_socialdb_4a19049f04b04690b5ed2eb479b37ce3.mdf"
selectable="false" saveas=""/>
</browse_contents>
```

In various embodiments, a view file, such as the one shown above, enables subcomponents to be displayed in a way that is meaningful to a user, e.g., by enabling a logical name that makes sense to the user in the context of the application the application data of which is included in the backup. In some embodiments, the view file includes for each separately recoverable subcomponent a user-friendly logical name abstracts logical representation of the data from the physical layout of objects and hierarchies within a backup. In various embodiments, the logical names are used to display a logical view of the backup components for the user. For example, in the case of a hypervisor backup, displaying a virtual machine name like "Finance_Dept_VM1" may make more sense to a user than listing corresponding physical file names, e.g., ".system_info"; "C:/ProgramData/Microsoft/Windows/Hyper-V/VirtualMachines/80D74828-BDF5-47DF-9556-D371874D38"; or "D:/store/VM_vhds/FIN-dept-AVVM1.vhd".

In various embodiments, a "view" file may be used by an application plugin and/or a developer thereof to restrict or control the granularity of partial restores from backups of the application's data and to maintain consistency of the application. Application plugins create mappings between logical application-level subcomponents with physical objects (e.g., files) included in the backup. When a user selects a logical subcomponent from the view for partial restore, in various embodiments the view file is mapped to the physical files to be restored from the tape or other media. In some embodiments, application plugins may be configured (e.g., coded) to tag their backup subcomponents in such a way that the desired granularity (e.g., logical subcomponent level, such as volume vs. directory vs. file) and consistency for the application in question are provided. For example, for a database application, it may be reasonable to provide granularity up to the database level, or for an NDMP plugin, the granularity may be desired to be restricted to volume or directory level rather than at file level, e.g., to get better performance.

Referring further to FIG. 2, once prepared, the backup data/metadata, including the view file, is/are sent to the backup server.

Figure 3:
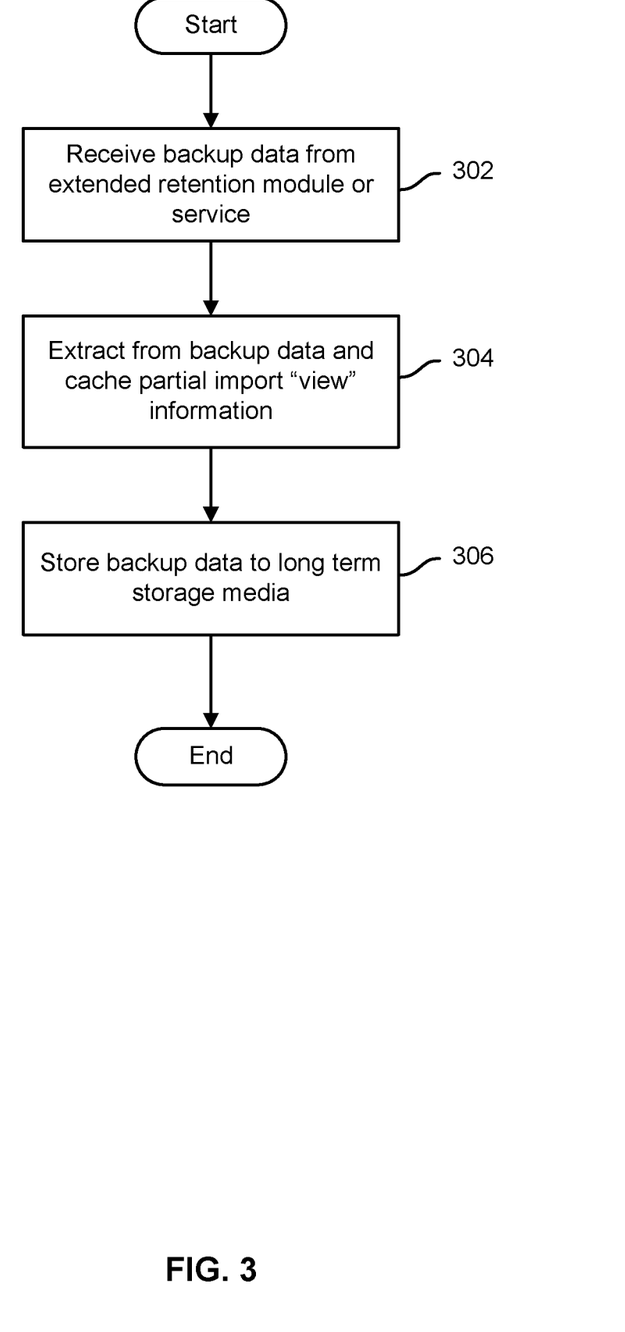
FIG. 3 is a flow chart illustrating an embodiment of a process to extract and cache meta-information to be used to support partial restores from backup.

FIG. 3 is a flow chart illustrating an embodiment of a process to extract and cache meta-information to be used to support partial restores from backup. In various embodiments, the process of FIG. 3 may be implemented by a media access node, such as media access node 116 of FIG. 1. In the example shown in FIG. 3, backup data is extracted from the backup server using an extended retention module, such as extended retention module 114 of FIG. 1, or some other source (302). A "view" file or other information included in the backup data to support partial recovery is extracted from the backup data and cached (304), e.g., in cache 122 of FIG. 1. The backup data is stored on tape or other long term storage media (306), e.g., by writing the backup data to tape or other media via a library, such as library 118 of FIG. 1.

Figure 4:
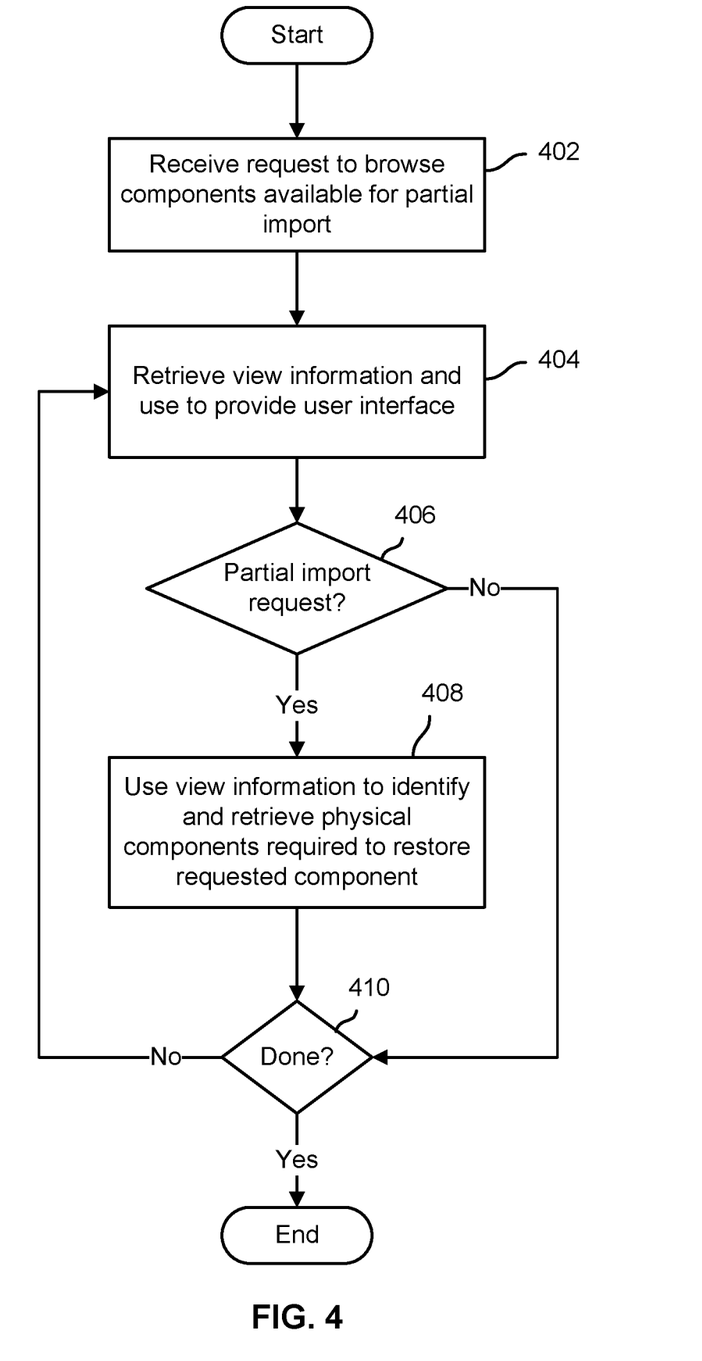
FIG. 4 is a flow chart illustrating an embodiment of a process to provide partial restores from backup.

FIG. 4 is a flow chart illustrating an embodiment of a process to provide partial restores from backup. In the example shown, a request to browse backup subcomponents available for partial restore is received (402). View file or other view information is retrieved for the backup and used to provide a graphical or other user interface that enables a user to browse for and select a subcomponent to be restored (404). For example, in some embodiments, if the view file is cached, the view file is read from the cache and used to provide the user interface (404). If the view file is not in the cache, in some embodiments it may be read from a specified or otherwise known location within the backup as stored on tape (or similar media).

If a partial restore request is received (406), the view information is used to identify and retrieve the physical components required to restore the requested backup subcomponent (408). The process of FIG. 4 continues until "done" (410), e.g., the user closes the displayed partial restore interface.

Figure 5:
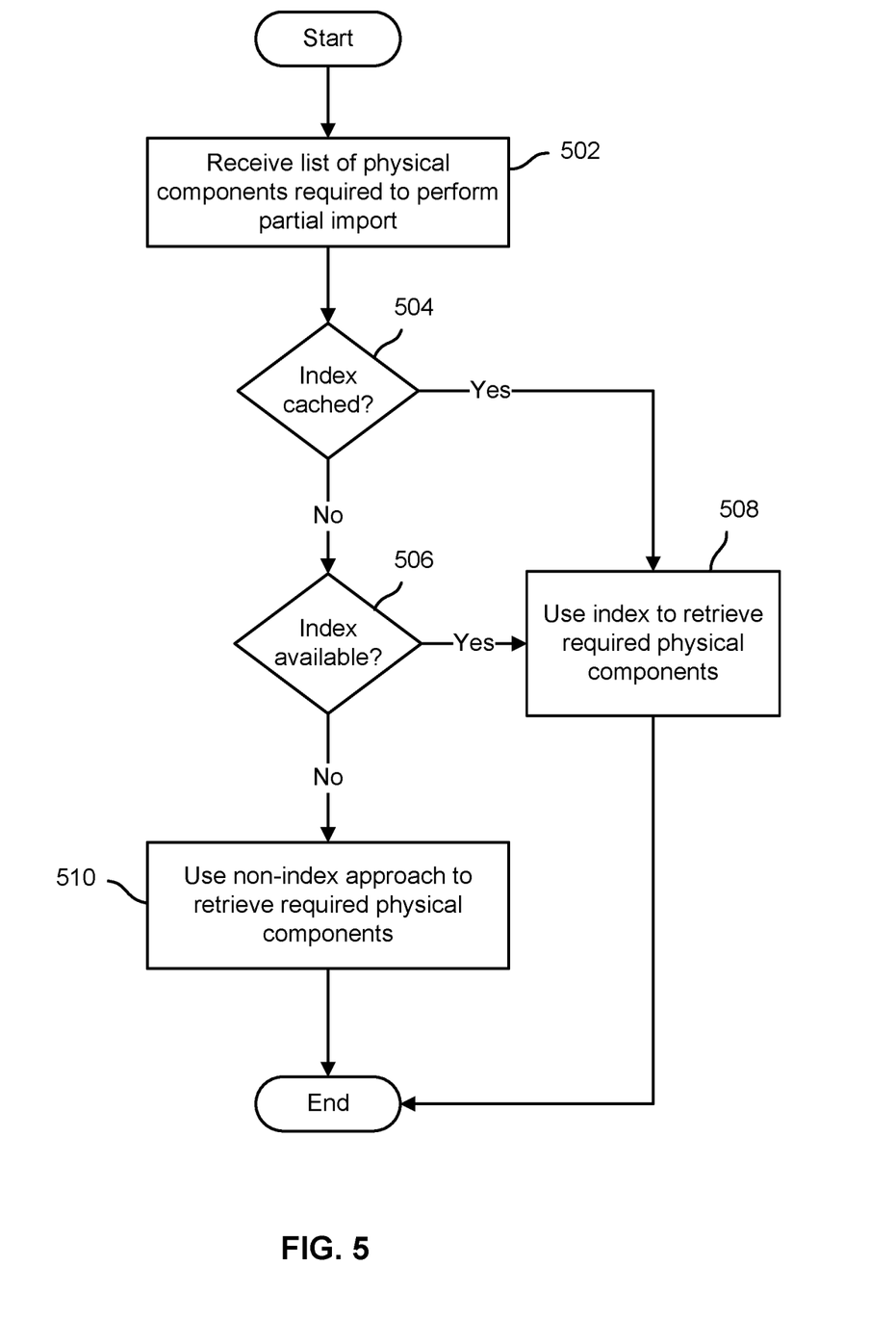
FIG. 5 is a flow chart illustrating an embodiment of a process to provide partial restores from backup.

FIG. 5 is a flow chart illustrating an embodiment of a process to provide partial restores from backup. In various embodiments, the process of FIG. 5 may be implemented at a media access node, extended retention module, or other node to locate and retrieve physical components of a subcomponent to be restored in a partial restore operation in one or two ways, depending on the availability of a backup application or other client file index for the backup. In the example shown, a list of physical components required to perform the partial restore of a subcomponent is received (502). If an associated client file or other index is cached (504), e.g., in a cache such as cache 122 of FIG. 1, or such an index is otherwise available (506), e.g., the index can be read from a known location on tape or other backup media, the index is searched to locate and retrieve the required physical components (508).

In some embodiments, required physical components are searched for in a client file index database to get each object's metadata, e.g., object id, offset etc. The entire list is constructed and presented to the backup application's API or other interface to restore the components from tape. In various embodiments, the backup application's implementation internally optimizes the list for best restore performance. For example, objects may be arranged in tape order and sequentially read from tape to get the best performance.

In some embodiments, search of the client file index database may be optimized by performing a single search on all the objects of a backup and filtering only the objects that are to be restored. Object comparison is performed in a manner that takes into account the directory-file hierarchy and a depth first search is performed, reducing memory requirements. In some embodiments, a reducing vector is used to store the target paths and once the objects corresponding to a target path have been filtered, it is removed.

Referring further to FIG. 5, if a client file or other index is not available (504, 506), an approach that does not rely on a client file or other index is used to locate and retrieve the required physical components (510). In some embodiments, all the objects are fetched from the tape in serial order and then data for unwanted objects is filtered out or discarded to achieve partial import. This method is a fallback approach used in some embodiments, and may be useful when the client file or other index gets expired or lost and scanning the tapes to get the indexes back is not feasible. Fast serial reads from the tape makes the non-index approach reasonably efficient for many cases.

Techniques disclosed herein may enable a user to select and import from tape only the data desired to be restored. This approach saves time and uses storage space, e.g., restored data staging areas, efficiently. The "view" concept solves the challenge of supporting partial import for various applications, across different platforms, by providing a common way for application-specific plugins to define which subcomponents are to be made available to partially restore, how they are to be displayed to users for selection, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
creating, by one or more processors, view information corresponding to a set of one or more physical components;
configuring, by one or more processors, an application plugin used to create a backup corresponding to the set of the one or more physical components, wherein the application plugin is associated with an application, and the view information corresponding to the set of the one or more physical components is included in the backup corresponding to the set of the one or more physical components; and
in response to a selection to restore a first component, restoring, by one or more processors, at least one physical component corresponding to the first component, the at least one physical component being determined to be comprised in the backup based at least in part on the view information, and the at least one physical component being comprised in the one or more physical components.

2. The method of claim 1, comprising receiving an indication of selection to restore the first component from the backup corresponding to the set of the one or more physical components.

3. The method of claim 2, wherein the indication of the selection to restore the first component from the backup corresponding to the set of the one or more physical components is received in connection with a partial restoration process.

4. The method of claim 2, wherein the indication of the selection to restore the first component is received via a user interface.

5. The method of claim 4, wherein the user interface displays a user-selectable representation of the first component.

6. The method of claim 4, wherein the user interface is provided at least in part by using the view information to determine and display information representing a plurality of components that are individually recoverable.

7. The method of claim 1, wherein the first component is associated with corresponding view information indicating that the first component supports individual restoration.

8. The method of claim 7, wherein to support individual restoration includes to be usable by an application in connection with providing an application-level functionality.

9. The method of claim 1, wherein the first component comprises an application-level logical object of an application with which the backup corresponding to the set of the one or more physical components is associated.

10. The method of claim 1, wherein the view information is created and included in the backup corresponding to the set of the one or more physical components by the application plugin used to create the backup corresponding to the set of the one or more physical components.

11. The method of claim 10, wherein the application plugin is associated with an application, and the application plugin used to create the backup corresponding to the set of the one or more physical components is configured according to one or more of a type or format of information used in the application with which the application plugin is associated.

12. The method of claim 1, wherein the view information created by the application plugin describes one or more partially-recoverable components of the backup corresponding to the set of the one or more physical components.

13. The method of claim 12, wherein the view information is descriptive in a context of the application with which the application plugin is associated.

14. The method of claim 1, further comprising:
receiving an indication to provide a user interface in connection with performing a partial restore;
obtaining the view information; and
providing the user interface based at least in part on the obtained view information.

15. The method of claim 1, wherein the set of the one or more physical components is determined based at least in part on a mapping of the set of the one or more physical components to the first component.

16. The method of claim 1, wherein the set of the one or more physical components include one or more files comprising the backup corresponding to the set of the one or more physical components.

17. The method of claim 16, further comprising using a file index of the backup corresponding to the set of the one or more physical components to locate the one or more files comprising the backup corresponding to the set of the one or more physical components.

18. The method of claim 17, wherein obtaining of the set of the one or more physical components comprises:
reading backup data from tape or other media comprising the backup corresponding to the set of the one or more physical components; and
filtering the read backup data to locate the set of the one or more physical components.

19. A system, comprising:
a communication interface; and
one or more processors coupled to the communication interface and configured to:
create view information corresponding to a set of one or more physical components;
configure an application plugin used to create a backup corresponding to the set of the one or more physical components, wherein the application plugin is associated with an application, and the view information corresponding to the set of the one or more physical components is included in the backup corresponding to the set of the one or more physical components; and
in response to a selection to restore a first component, restore at least one physical component corresponding to the first component, the at least one physical component being determined to be comprised in the backup based at least in part on the view information, and the at least one physical component being comprised in the one or more physical components.

20. A computer program product, the computer program product being embodied in a non-transitory computer-readable storage medium and comprising computer instructions for:
creating, by one or more processors, view information corresponding to a set of one or more physical components;
configuring, by one or more processors, an application plugin used to create a backup corresponding to the set of the one or more physical components, wherein the application plugin is associated with an application, and the view information corresponding to the set of the one or more physical components is included in the backup corresponding to the set of the one or more physical components; and
in response to a selection to restore a first component, restoring, by one or more processors, at least one physical component to the first component, the at least one physical component being determined to be comprised in the backup based at least in part on the view information, and the at least one physical component being comprised in the one or more physical components.

* * * * *